United States Patent [19]
Morris

[11] Patent Number: 5,918,914
[45] Date of Patent: Jul. 6, 1999

[54] SEALING LOCK JOINT PIPE FITTING

[76] Inventor: Waldo Ivan Morris, 4512 Lakeside Rd., Marion, Iowa 52302

[21] Appl. No.: 08/978,411

[22] Filed: Nov. 25, 1997

[51] Int. Cl.⁶ .................................................. F16L 17/02
[52] U.S. Cl. ........................... 285/351; 285/369; 285/910
[58] Field of Search .................................. 285/351, 344, 285/369

[56] References Cited

U.S. PATENT DOCUMENTS

| | | | |
|---|---|---|---|
| 2,094,629 | 10/1937 | Whittam | 285/344 X |
| 2,738,992 | 3/1956 | Heisler | 285/344 X |
| 2,829,909 | 4/1958 | Magnani | 285/351 X |
| 3,900,221 | 8/1975 | Fouts . | |
| 4,130,302 | 12/1978 | Mitchell et al. . | |
| 4,707,000 | 11/1987 | Torgardh . | |
| 4,811,975 | 3/1989 | Paul, Jr. et al. . | |
| 4,869,534 | 9/1989 | Ketcham et al. . | |
| 5,024,469 | 6/1991 | Aitken et al. . | |
| 5,180,197 | 1/1993 | Thompson | 285/351 |
| 5,308,123 | 5/1994 | Zorn | 285/351 X |
| 5,433,485 | 7/1995 | Austin, Jr. et al. . | |
| 5,584,512 | 12/1996 | Carstensen . | |
| 5,662,360 | 9/1997 | Guzowski . | |

FOREIGN PATENT DOCUMENTS

| | | | |
|---|---|---|---|
| 908691 | 4/1954 | Germany | 285/344 |
| 352212 | 6/1936 | Italy | 285/351 |

OTHER PUBLICATIONS

CertainTeed, Yelomine PVC Pipe and Fittings Brochure 1985.

*Primary Examiner*—Dave W. Arola
*Attorney, Agent, or Firm*—Glenn Johnson

[57] ABSTRACT

The invention provides a method for sealing and locking together interconnectable pipe for industrial, commercial and other uses. The sealed locking joint is comprised of the smaller end of one pipe, spigot end, which is inserted into the larger end of the receiving pipe, bell end. A sealing gasket and a corresponding locking gasket are utilized to retain the pipe in its assembled position and prevent leakage of material at the joint. Alternatively, a sleeve may be utilized into which is inserted the spigot ends of the pipe, said sleeve having positioned within it sealing gaskets and locking gaskets similar to the configuration utilized in the bell end of the alternate assembly.

10 Claims, 5 Drawing Sheets

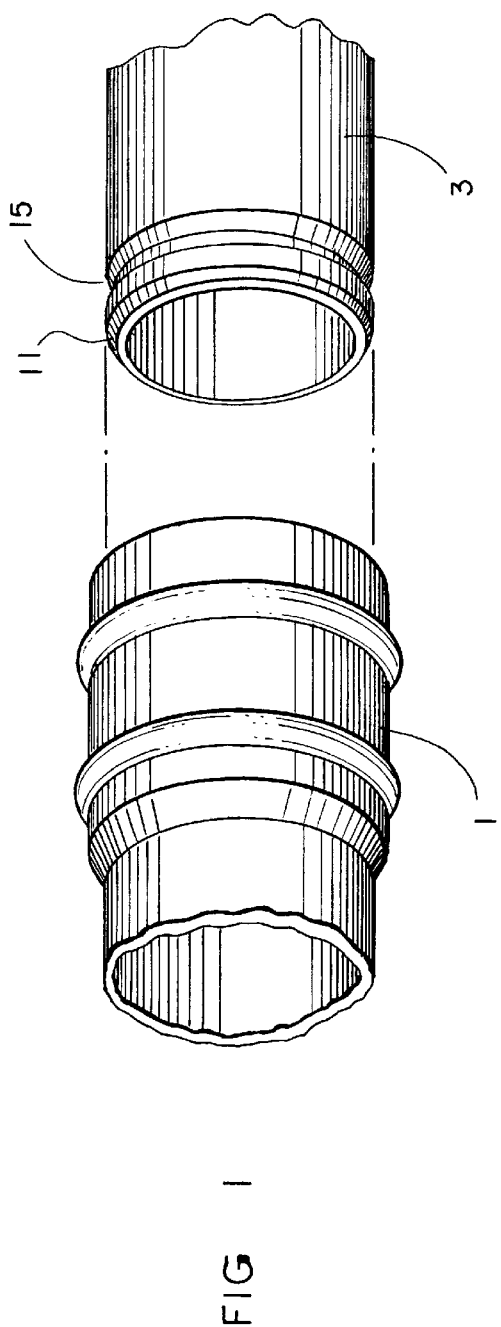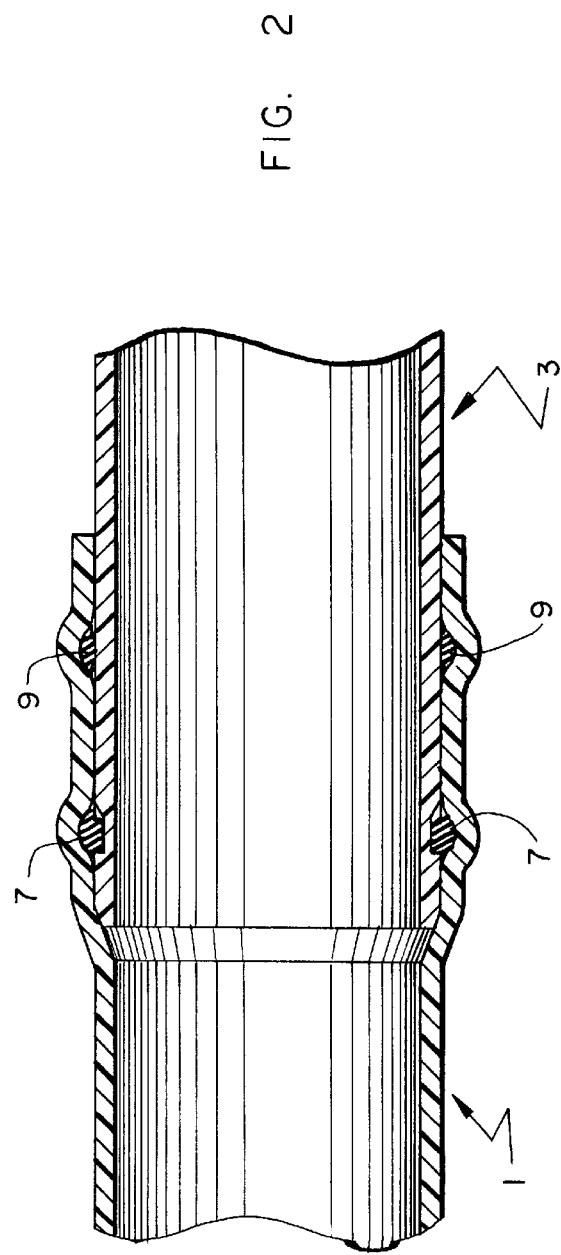

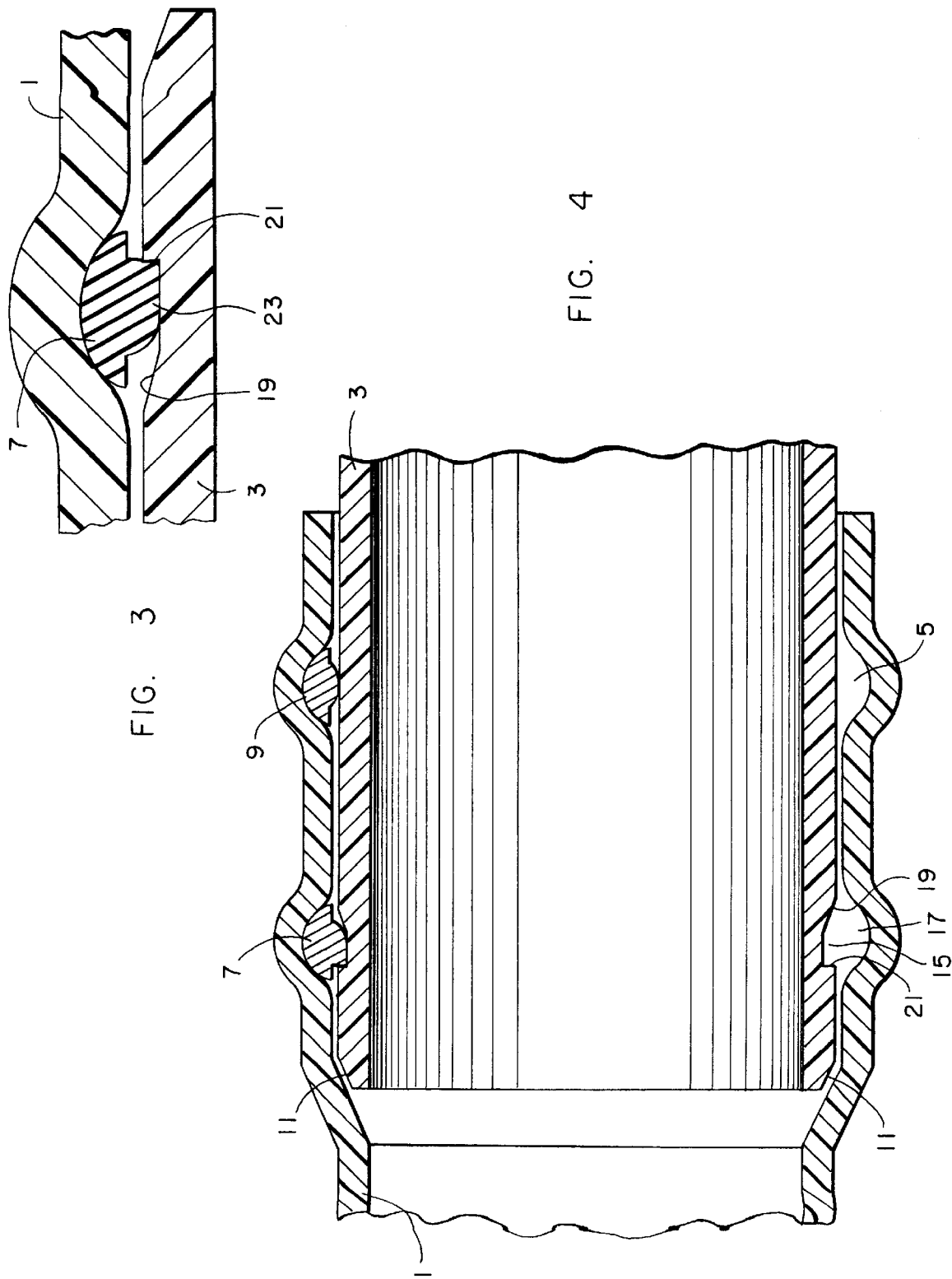

SEALING LOCK JOINT PIPE FITTING

BACKGROUND OF THE INVENTION

The use of interconnecting pipe, particularly plastic pipe, is becoming more common in industrial and commercial settings. As a result, there is an ever increasing demand for speed and ease of installation while retaining leak-proof seals and providing a joint that will not separate during installation or from hydraulic pressure within the pipe, thus preventing spills of environmentally hazardous substances, product, or other materials being carried through the interconnected pipes.

Early designs utilized a sleeve assembly which fits over the outside of the two pipe ends to be joined. An example of this prior art is found in the Magnani patent, U.S. Pat. No 2,829,909, which utilized an external sleeve and a plurality of O-rings retained within grooves in the inner wall of the sleeve. These O-rings provided the seal for the joint and the frictional resistance to retain the pipe ends joined together within the external sleeve. This design, however, did not provide a positive locking mechanism to securely retain the two pipe ends within the sleeve.

Another example of a sleeve fitting is found in the Mitchell patent, U.S. Pat. No. 4,130,302, which also utilizes an O-ring configuration within pressure chambers that provides the seal within the sleeve. A crimp is made in the sleeve once the pipe ends are inserted to aid in retention of said pipe within the sleeve.

Other pipe joint assembly techniques utilize an external sleeve with a retention groove circumferentially cut into the connecting ends of the pipe. The inserted pipes are then retained within the connecting joint by means of a ring assembly or nylon splines. The Carstensen patent, U.S. Pat. No. 5,584,512, is an example of a pipe connection fitting whereby the seal is located at the point where the two connecting pipes meet, and the retention means consists of increasingly wider snap rings contained within the inner diameter of the sleeve which drop into place in matching width grooves contained in the outer diameter of the spigot end upon insertion within the sleeve.

Similarly, CertainTeed Corporation markets plastic pipe utilizing a sleeved joint connection assembly wherein the connecting pipes are inserted into the sleeve until contacting a positive stop. A circumferential groove is cut within the inner diameter of the sleeve on each side in proximity to the positive stop into which a rubberized ring gasket is placed so as to seal the joint. Located outwardly from this groove, a spline groove is cut circumferentially in the inner diameter of the sleeve. A corresponding matching spline groove is located in the outer diameter of the inserting pipe into which a nylon spline is inserted which is sufficiently stiff so as to act in concert with the matching spline grooves to prevent the joined pipes from pulling apart.

With the locking joint available from CertainTeed Corporation, the worker must thread nylon splines through the matching spline groove opening at each end of the sleeve adding to the number of parts necessary to be handled and the time associated with installation of the interconnected pipe.

The current invention can use a sleeve assembly such as has been used in the past, but also is designed for use in pipe having a bell end which receives the corresponding spigot end of the pipe so as to create the sealed lock joint. The ease and speed of assembly and the diminished number of parts necessary for the assembly process are evident.

A more significant problem associated with sealing lock joints holding interconnected pipe concerns the grooves circumferentially cut into the outer diameter of the pipe wall in conjunction with the sleeve assembly or other connecting apparatus.

In both the Carstensen U.S. Pat. No. 5,584,512, and the system offered for sale by CertainTeed Corporation, receiving grooves are circumferentially cut in the outer diameter of the pipe to be connected. This creates a point of weakness by reducing the minimum wall thickness of the pipe at that locale. As a result, some pipes that claim to meet minimum wall thickness specifications for projects are in actuality under-dimensioned resulting in rejection of the installation by Engineers. In order to overcome this dimensional deficiency pipe having a greater thickness may be utilized which, when the circumferential groove is cut, will maintain the minimum wall thickness required by the specification of the project. This, however, adds significantly to the expense of the pipe to be utilized on the project.

The reason for increasing concern and rejection of pipe connection systems wherein the circumferential groove cut in the outer diameter of the connecting pipe is the location of the groove in relation to the seals. In the above cited references, the circumferential groove in the outer diameter of the connecting pipe is cut on the pressure side of the pipe. In other words, as a result of the location of the retention groove in conjunction with the seal of the joint, the inner wall of the pipe immediately opposite the groove cut in the outer diameter is carrying the full pressure of the liquid or other material being retained within and carried through the pipe. By reducing the minimum wall thickness at this locale, the pipe is weakened and presents the opportunity for cracks or fractures developing with the ultimate leakage of material out of the pipe.

The current invention addresses this concern by locating the circumferential groove cut in the outer diameter of the inserting end of the pipe inside of the sealing gasket. As a result, the inner wall of the inserting pipe at the locale corresponding to the circumferential groove is not required to carry the pressure of the material contained therein. This pressure is carried by the pipe wall comprising the bell end or sleeve of the receiving pipe into which no groove has been cut so that minimal wall thickness requirements are maintained thereby enhancing the strength and durability of the pipe at the point of connection.

It is evident to those skilled in the art that this invention may be used on a wide range of pipe diameters and is particularly useful in the interconnection of PVC pipe. It is further useful for the interconnection of other plastic pipe, metallic pipe and piping made of other materials.

SUMMARY OF THE INVENTION

The invention may be practiced utilizing either a sleeve assembly into which is inserted the corresponding spigot ends of the pipe undergoing assembly, or by use of a belled end pipe which is assembled without need of a sleeve. The sleeve assembly utilizes two grooves located circumferentially in the interior wall near each end of the sleeve. The outer grooves, those grooves nearest to the ends of the sleeve, retain the sealing gasket in position. The inner grooves retain the locking gaskets in position. A raised ridge at the middle of the interior of the sleeve may be employed as a positive stop to the pipe ends being inserted therein. A locking notch is circumferentially formed on the exterior of the spigot end corresponding in location to the locking gasket position within the sleeve. When the spigot end is inserted into the sleeve, the locking gasket drops into place within this groove which functions to retain the pipe within the sleeve. It will be noted that the locking notch located near the spigot end is positioned inwardly of the location of the sealing gasket. This functions to ensure that the reduction in wall thickness in the pipe is not in a wall section under pressure from the product that is carried within the assembled pipe sections, thereby enhancing the strength of the assembled pipe sections.

Similar to the sleeve assembly, the sleeveless sealing lock joint pipe fitting utilizes a belled end on one end of the pipe and a spigot end on the opposing end of the pipe. The interior wall of the belled opening forms two grooves for retention of the sealing gasket and locking gasket. The locking gasket is located inwardly of the sealing gasket. The spigot end of the pipe may be tapered to facilitate insertion past the two gaskets, and contains on its outer wall a circumferential notch corresponding to the location of the locking gasket position in the receiving bell end. When inserted into the bell end, the locking gasket drops into place within the notch located in the spigot end thereby firmly retaining the assembled pipes together. As with the sleeve assembly, the locking gasket groove is located in the spigot end inwardly of the sealing gasket thereby insuring that the reduced wall thickness area at this location is not under pressure.

BRIEF DESCRIPTION OF THE DRAWING

FIG. 1 is a perspective view illustrating the sealed lock joint comprised of a pipe section having a bell end into which is inserted the spigot end of the pipe section to be joined.

FIG. 2 is cut-away perspective view illustrating the sealed lock joint showing the spigot end of the first pipe inserted within the bell end of the second pipe. The retaining mechanism of the locking gasket and its position in relation to the sealing gasket may be appreciated.

FIG. 3 is a cut-away perspective view illustrating the locking gasket retention groove and locking gasket as positioned therein within the bell end of the receiving pipe. The view also closely illustrates a cut-away section of the spigot end of the inserting pipe showing the locking notch with the tapered wall on its one side and retention wall on its other side.

FIG. 4 is a cut-away perspective view illustrating the bell end of one pipe receiving the spigot end of the inserting pipe. The bottom of the perspective view does not show the gaskets merely for illustrative purposes so that the configuration of the locking gasket retention groove and sealing gasket retention groove in the bell end and locking notch in the spigot end of the inserting pipe may be appreciated.

DESCRIPTION OF THE PREFERRED EMBODIMENT OF THE INVENTION

Figure 5:
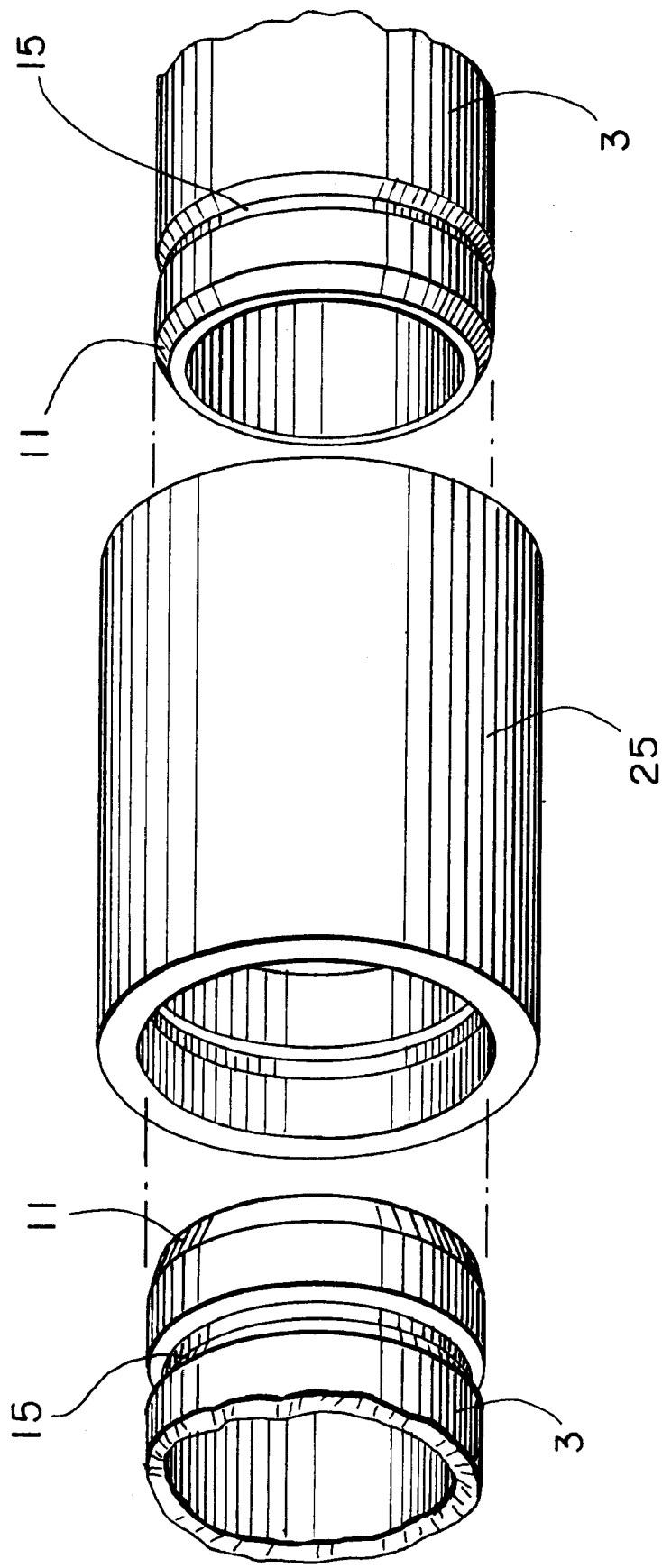
FIG. 5 is a perspective view illustrating the sealed lock joint comprised of a sleeve into which the spigot end of two inserting pipes are positioned to join the pipes.

Referring to FIGS. 1 through 4, the bell end 1 of the pipe comprising one-half of the sealing lock joint is tapered or belled outwardly so as to increase the inner diameter at its end for purposes of receiving the spigot end 3 of the pipe forming the other half of the sealed lock joint. At two specified locales, the bell end 1 of the pipe is formed so as to create circumferential retaining grooves within its interior wall, the sealing gasket retention groove 5 and locking gasket retention groove 17, to receive and retain the locking gasket 7 and sealing gasket 9. The outer wall of the connecting pipe at its spigot end 3 is tapered 11 to compress the gaskets 7, 9 and allow the spigot end 3 to slide past the gaskets 7,9 upon insertion. An insertion mark is affixed to the spigot end of the pipe to indicate when the pipe is fully inserted.

A locking notch 15 is formed or cut into the spigot end 3 of the pipe to be inserted corresponding in location to the locking gasket retention groove 17 located within the bell end 1 of the receiving pipe. The locking notch 15 has two walls, the first wall located furthest from the end of the pipe being tapered 19 which allows the sealing gasket 9 to move slideably past the locking notch 15 as the end of the spigot end 3 is inserted into the bell end 1. The second wall of the locking notch creates the retention wall 21. The retention wall 21 rests at a position falling within a range of approximately 90° to 110° from the exterior surface of the pipe so as to provide a load bearing surface area of sufficient proportion against which the stem 23 of the locking gasket 7 will come to rest so as to retain the interconnected pipe sections together.

The locking gasket 7 configuration is mushroom shaped. The upper portion is firmly seated within and retained by the locking gasket groove 17 formed within the interior of the bell. The lower end of the locking gasket forms the stem 23 which extends downwardly away from the retention groove 17. The locking gasket 7 is comprised of material that is sufficiently elastic so as to allow the movement of the end of the inserting pipe past it, but sufficiently stiff so as to rest against the retention wall 21 of the locking notch 15 formed in the spigot end so as to prevent the separation of the joined pipe.

At the location on the outer wall of the spigot end 3 corresponding to the position of the sealing gasket 9 upon insertion within the bell end 1, there is no groove formed or cut, nor other diminution of the minimal wall thickness of the pipe. The sealing gasket 9 is comprised of a material sufficiently elastic so as to form completely around and seal the joint so that no leaks may occur when product is maintained or pumped through the interconnected pipe under pressure. The locking joint is designed to utilize any number of commercially available sealing gaskets.

Figure 6:
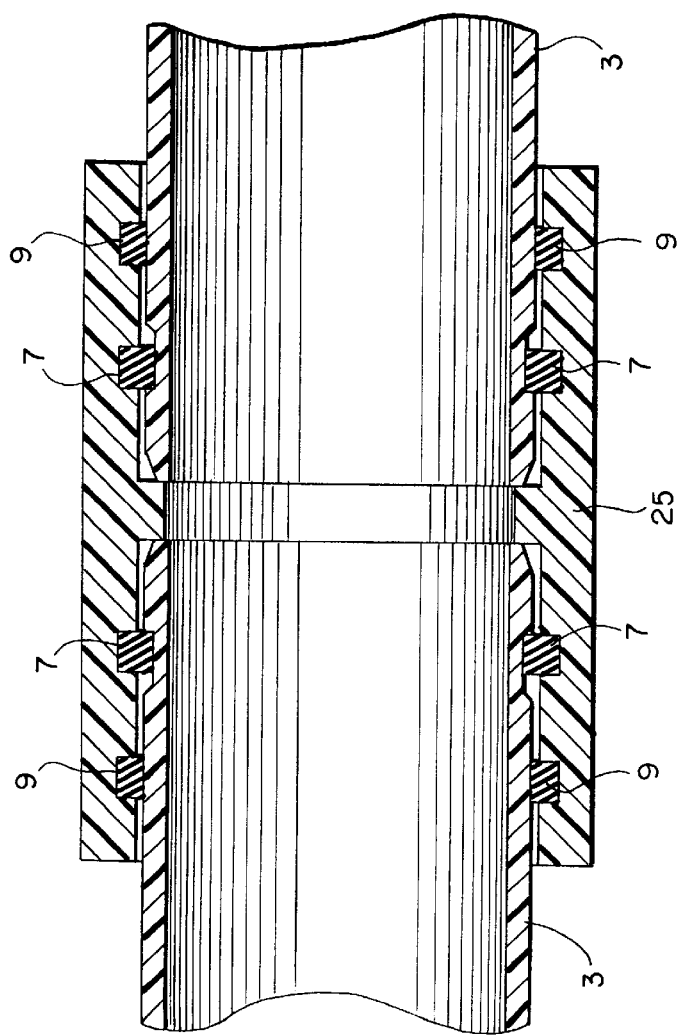
FIG. 6 is a cut-away perspective view illustrating two spigot ends of pipe inserted and retained within the sleeve forming the sealed lock joint.
Figure 7:
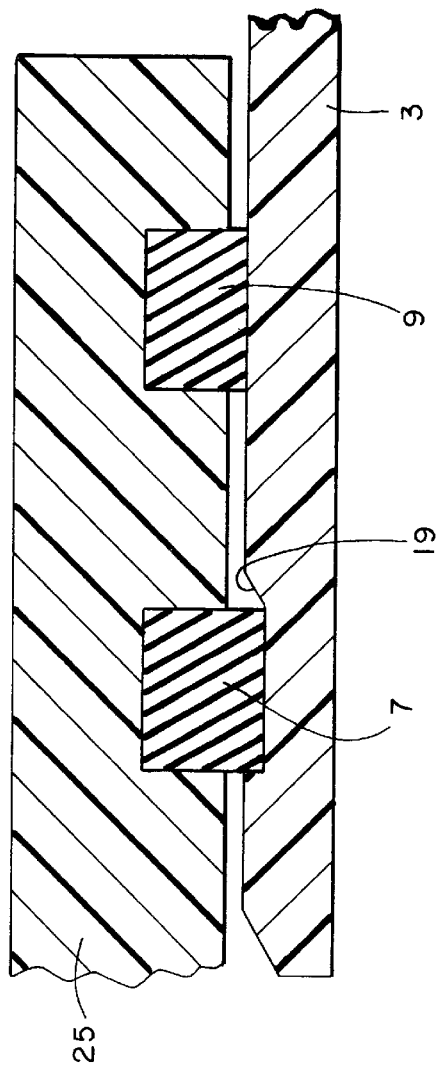
FIG. 7 is a close-up cut-away perspective showing the locking gasket and sealing gasket positioned and retained within the sleeve in relation to the spigot end of the inserting pipe retained within the sleeve having a locking notch.
Figure 8:
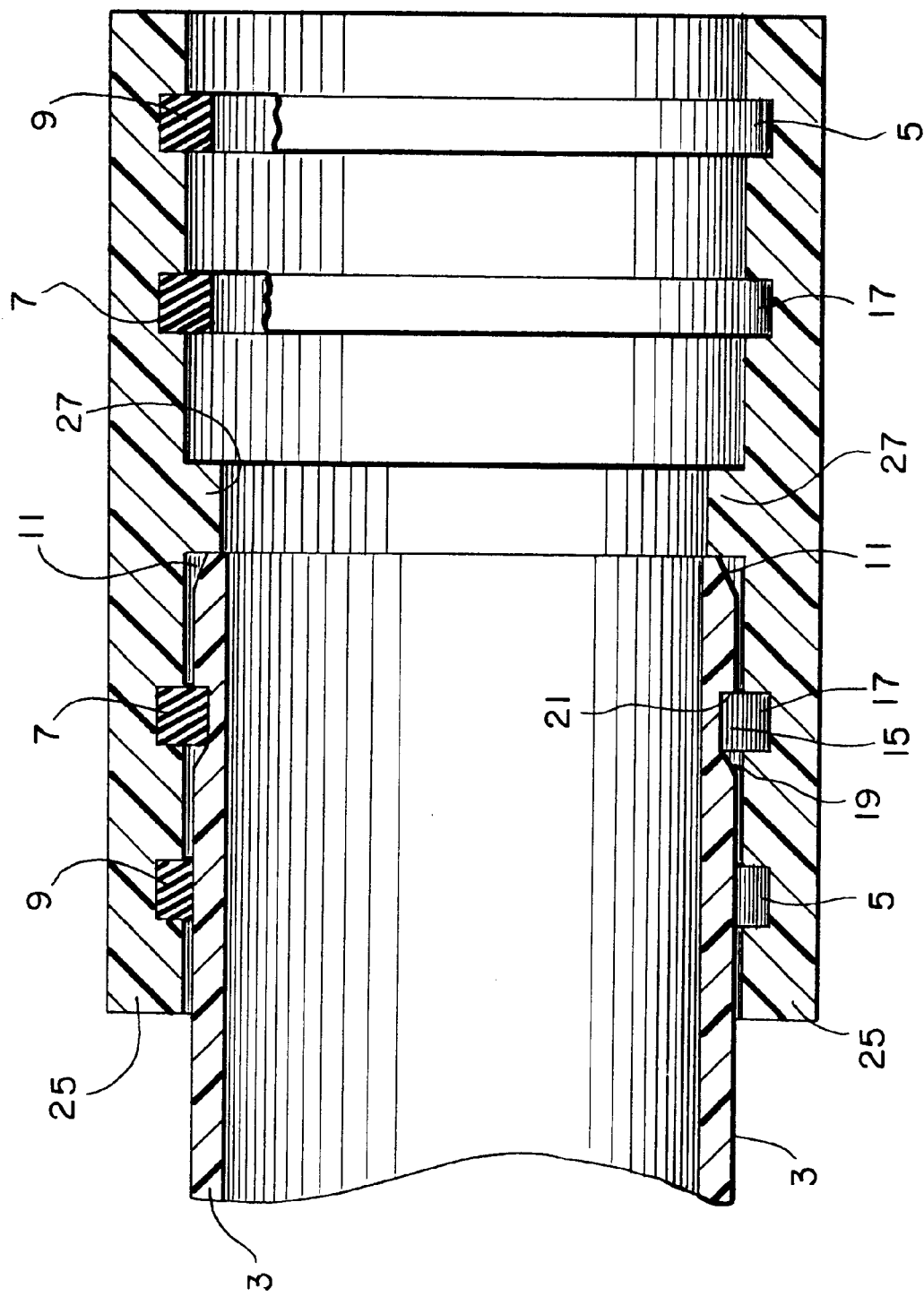
FIG. 8 is a cut-away perspective view showing the sleeve ready to receive the spigot end of one pipe on one side with the spigot end of a second pipe inserted and retained on the other side. The bottom of the cut-away perspective view does not show the sealing gaskets nor the locking gaskets merely for illustrative purposes so that the configuration of the gasket retention grooves in the sleeve and the configuration of the locking notch in the spigot end of the inserted pipe may be appreciated.

Referring to FIGS. 5 through 8, the spigot end 3 of the pipe retains the same configuration as is seen in FIGS. 1 through 4. The sleeve 25 is configured so as to create at its middle an interior ridge 27 extending downwardly from the inner wall thereby creating a positive stop against which the end of the inserting pipe will come to rest. The sealing gasket 9 is configured so as to match the configuration of the sealing gasket groove 5 located within the inner wall of the sleeve 25 on each side. The sealing gasket 9 will function in the same manner as described in conjunction with FIGS. 1 through 4. The locking gasket 7 will also be configured so as to fit firmly within and be retained by the locking gasket groove 17 formed within the inner wall of the sleeve 25 on each side. The locking gasket 7 has a stem extending downwardly which occupies the space created by the matching locking notch located in the outer wall of the spigot end of the inserting pipe. The locking gasket stem 23 and the locking notch 15 will retain the inserted pipe within the sleeve 25 in the same manner as described in reference to FIGS. 1 through 4.

As can be seen by reference to FIGS. 1 through 8, the configuration of the locking groove 17 in the bell end as shown in FIGS. 1 through 4 and in the sleeve as shown in FIGS. 5 through 8 which retains the locking gaskets 9 and sealing gaskets 7 may vary. Whatever configuration is utilized, the gasket will be formed so as to match this configuration and be so dimensioned so as to be firmly held in place.

In its preferred embodiment, the stem 23 of the sealing gasket is beveled on the side farthest from the end of the inserting pipe. This will facilitate passage of the inserting pipe past the locking gasket 9 until it contacts the positive stop, or is otherwise positioned correctly, and the stem of the locking gasket drops into the locking notch 15 formed in the spigot end 3.

Having thus described the invention in connection with the preferred embodiments thereof, it will be evident to those skilled in the art that various revisions can be made to the preferred embodiments described herein without departing from the spirit and scope of the invention. It is our intention, however, that all such revisions and modifications that are evident to those skilled in the art will be included within the scope of the following claims.

I claim:

1. A sealing lock joint pipe fitting for connecting the spigot ends of pipes together comprising:
    a sleeve having an inner wall and outer wall and open ends for receiving the spigot ends of pipes to be connected;
    a pair of pipe each with inner and outer walls and each having spigot ends, each spigot end having a locking notch formed within the outer wall;
    the sleeve having spaced-apart first and second circumferential grooves formed within the inner wall near each open end, the second groove being nearer the center of the sleeve than the first groove;
    a sealing gasket positioned within each first groove to provide a seal with the outer wall of the spigot end of a pipe received in the open end of the sleeve; and
    a locking gasket positioned within each second groove to engage the locking notch on the spigot end of a pipe received in the open end of the sleeve so as to retain the pipe within the sleeve.

2. A sealing lock joint pipe fitting for connecting the spigot ends of pipes together as set forth in claim 1 wherein the sleeve has a circumferential ridge that extends downwardly from the inner wall of the sleeve generally at its midpoint, which ridge is engageable with the spigot ends of pipes received in said sleeve.

3. A sealing lock joint pipe fitting for connecting the spigot ends of pipes together as set forth in claim 1 wherein the outer wall of each spigot end is tapered thereby facilitating insertion into the sleeve and passage by the sealing gasket and locking gasket positioned therein.

4. A sealing lock joint pipe fitting for connecting the spigot ends of pipes together as set forth in claim 1 wherein the locking notch formed at the spigot end of each pipe is tapered to facilitate insertion of the spigot end past the sealing gasket positioned within the sleeve.

5. A sealing lock joint pipe fitting for connecting the ends of pipes together as set forth in claim 1 wherein the inner portion forms a stem extending out of the groove which stem is configured to facilitate the insertion of the spigot end within the sleeve and thereafter firmly retain the assembled pipe within the sleeve.

6. A sealing lock joint pipe fitting for connecting the spigot end of a pipe into the bell end of another pipe comprising:
    a pair of pipe each with an inner wall and outer wall and each having an open spigot end and an open bell end;
    the bell end of each pipe having spaced-apart circumferential grooves formed within the inner wall near the open end, the first groove being nearer to open end than the second groove;
    a sealing gasket positioned within the first groove for sealing engagement against said spigot end;
    a locking gasket positioned within the second groove; and
    a locking notch having a first side and a second side formed within the outer wall of the spigot end of the pipe near the open end for receiving said locking gasket.

7. A sealing lock joint pipe fitting for connecting the ends of pipe together as set forth in claim 6 wherein the bell end of the pipe is tapered inwardly creating a ridge that is engageable with the spigot end of the pipe received in said bell end.

8. A sealing lock joint pipe fitting for connecting the ends of pipe together as set forth in claim 6 wherein the outer wall of each spigot end is tapered thereby facilitating insertion into the bell end of the receiving pipe.

9. A sealing lock joint pipe fitting for connecting the ends of pipes together as set forth in claim 6 wherein the locking notch formed at the spigot end of each pipe is tapered to facilitate insertion of the spigot end past the sealing gasket positioned within the bell end of another pipe.

10. A sealing lock joint pipe fitting for connecting the ends of pipes together as set forth in claim 6 wherein the inner portion of the locking gasket forms a stem extending out of the groove which stem is configured to facilitate the insertion of the spigot end within the bell end and thereafter firmly retain the assembled pipes.

* * * * *